United States Patent
Cao et al.

(10) Patent No.: US 7,844,552 B2
(45) Date of Patent: Nov. 30, 2010

(54) SHARED SOFTWARE AGENT FOR CUSTOMER RELATIONS MANAGEMENT SERVICES

(75) Inventors: Tam M. Cao, Trophy Club, TX (US); Rodney L. Fleming, Bedford, TX (US); Romelia H. Flores, Keller, TX (US); Mathews Thomas, Flower Mound, TX (US)

(73) Assignee: International Business Machines Corporation, Armonk, NY (US)

(*) Notice: Subject to any disclaimer, the term of this patent is extended or adjusted under 35 U.S.C. 154(b) by 1761 days.

(21) Appl. No.: 10/281,600

(22) Filed: Oct. 28, 2002

(65) Prior Publication Data

US 2004/0083113 A1 Apr. 29, 2004

(51) Int. Cl.
*G06Q 10/00* (2006.01)
(52) U.S. Cl. .................................. 705/304; 705/1.1
(58) Field of Classification Search ............... None
See application file for complete search history.

(56) References Cited

U.S. PATENT DOCUMENTS

| | | | | |
|---|---|---|---|---|
| 5,884,032 | A | 3/1999 | Bateman et al. | 395/200.34 |
| 6,115,693 | A | 9/2000 | McDonough et al. | 705/10 |
| 6,134,530 | A | 10/2000 | Bunting et al. | 705/7 |
| 6,138,139 | A | 10/2000 | Beck et al. | 709/202 |
| 6,167,395 | A | 12/2000 | Beck et al. | 707/3 |
| 6,259,774 | B1 | 7/2001 | Miloslavsky | 379/90.01 |
| 6,295,551 | B1 * | 9/2001 | Roberts et al. | 709/205 |
| 7,162,440 | B2 * | 1/2007 | Koons | 705/26 |
| 2001/0003523 | A1 | 6/2001 | Crandall et al. | 370/352 |
| 2003/0004822 | A1 | 1/2003 | Shorter et al. | 705/26 |

FOREIGN PATENT DOCUMENTS

WO WO 00/73958 12/2000

OTHER PUBLICATIONS

J. Chatterjee, et al "Managing Custer Relationship in the e-Business Economy"; Smart Business Today; as submitted by applicant.*
"New Saleslogix2000 Provides Integrated eCRM suit to deliver 'e-business now' for mid-market companies"; PR Newswire; Feb. 16, 2000.*
IBM Knowledge and Content Management Services for Customer Relationship Management, ibm.com/services, IBM Global Services, (2000).
IBM Content Manager: Why Add Content to Your SIEBEL Call Center Installation, *IBM Corp.*, <http://www-4.ibm.com/software/data/cm/siebel.html>, (visited Oct. 2, 2001).

(Continued)

*Primary Examiner*—Traci L Casler
(74) *Attorney, Agent, or Firm*—Novak Druce + Quigg

(57) ABSTRACT

A method for implementing a customer relationship management system can include establishing a plurality of customer contact channels within a customer relationship management services system. A software component can be associated with each of customer contact channels. A shared software agent can be accessed by software components through a publicly accessible network. The shared software agent performs at least one data management task and displays at least one visual element within a graphical user interface of an accessing software component.

10 Claims, 3 Drawing Sheets

OTHER PUBLICATIONS

J. Chatterjee, et al., Managing Customer Relationship in the e-Business Economy, *Smart Business Today*, <http://www.india-today.com/btoday/19991222/exclusives.html>, visited Oct. 2, 2001).

K. Ohaegbu, et al., Customer Relationship Management in E-Commerce: The Call Center Solution, *Southeastcon 2000 Proc. of the IEEE*, pp. 391-394, (Apr. 7-9, 2000).

Customer Support by Calling Agent Automatically on Web Browser During Self Problem Determination, *IBM Research Disclosure*, art. 41459, p. 1374, (Oct. 1998).

A Method to Inform the Customer Information to the Agent of Call Center in Advance, *IBM Research Disclosure*, art. 41711, pp. 151-152, (Jan. 1999).

Coordinated Voice and Data Transfer Over Public Network, *IBM Technical Disclosure Bulletin*, vol. 39, No. 11, pp. 185-187, (Nov. 1996).

R. B. Ferguson, Corio Provides a Unified Picture, *eWeek*, <http://www.eweek.com/print_article/0,3668,1=29065,00.asp>, (Jul. 15, 2002).

\* cited by examiner

SHARED SOFTWARE AGENT FOR CUSTOMER RELATIONS MANAGEMENT SERVICES

BACKGROUND OF THE INVENTION

1. Technical Field

The present invention relates to the field of software and electronic business, and more particularly, to a system and a method for providing customer relationship management.

2. Description of the Related Art

Businesses constantly strive for customer approval and satisfaction. One method businesses can use to differentiate themselves from each other is through customer relationship management (CRM) services. By providing additional product information, personalized customer incentive plans and product support, businesses hope to build and sustain long-term customer loyalty. These services, however, are often expensive to implement. Further complicating matters is the tendency of customers to interact with a business using multiple mediums or distribution channels.

Distribution channels for business products can include but are not limited to, the Internet, retail outlets, wholesale outlets, and telephone centers. As technology improves, more customers utilize multiple distribution channels in making purchases. For example, a person purchasing an airline ticket may check prices on several Web sites, and then purchase a ticket by placing a telephone call to a service representative. Similarly, a car purchaser may research products on the Internet and ultimately purchase a vehicle at a dealership. Unfortunately, it is not uncommon for offers to be different from one distribution channel to the next. For example, an airline ticket deal posted on the Internet may be unavailable for telephone purchasers.

Customers become frustrated when one distribution channel cannot honor specials or deals disclosed by another distribution channel within a given business entity. Effective integration of business channels becomes even more important when a business incorporates some form of customer incentive program, such as frequent flyer miles. Customers can become quite upset when a promised incentive is not recognized by a chosen distribution channel. In fact, inconsistencies relating to customer loyalty programs among the various distribution channels of a business can have the net result of alienating, not rewarding, customers.

To limit discrepancies among channels, conventional CRM systems attempt to share data. This sharing usually occurs between otherwise autonomous applications across a network, wherein each application maintains its own distinct implementation for data management and graphical user interface (GUI) functions. Implementation and maintenance expenses relating to conventional CRM systems composed of many discrete applications, however, can be substantial.

Consider, for example, likely implementation costs associated with a conventional CRM system. Initially, a CRM implementer needs to research retail solutions to determine which, if any, satisfy the needs of the business for which the CRM system is intended. Should no acceptable solution exist, custom software must be developed. Furthermore, special care is necessary to ensure that all chosen CRM applications are compatible with one another. Often compatibility requires that information be converted from one format to another. For example, a Web site may utilize markup language formatted data, such as Hypertext Markup Language (HTML) format, while a retail application can utilize a database format, such as Structured Query Language (SQL).

Additionally, complications necessary for implementing a CRM system can result in extensive maintenance and training costs. To avoid these costs, businesses often make compromise choices that limit data sharing among the various CRM applications. Accordingly, information is not perfectly synchronized among CRM applications, resulting in different information being available through different distribution channels. Such inconsistencies can result in discrepancies among distribution channels and customer dissatisfaction.

SUMMARY OF THE INVENTION

The invention disclosed herein provides a cost effective method for implementing a customer relationship management (CRM) system. In particular, the present invention contemplates the existence of a shared software agent that can share both graphical and data management functionality across a publicly accessible network. Accordingly, each application within a CRM system can access the shared software agent, gaining substantial functionality without the need for duplicative implementation within each CRM application. For example, an airline can implement a shared software agent that includes frequent flyer information. This shared software agent can then be accessed by a customer through a kiosk or Web site as well as by service center personnel. Storing customer information within a shared software agent to be accessed by multiple CRM applications can greatly reduce the complexity of individual applications while providing access to necessary information.

One aspect of the present invention can include a method for implementing a customer relationship management (CRM) system that can include many customer contact channels or interaction points. Accordingly, the method associates at least one CRM application with each customer contact channel. Thus, a CRM application can be designed either for authorized business personnel or for customer access. A particular CRM application, a call center application, can access each of the shared software agents within the CRM system. For example, if the CRM system contains multiple shared software agents, the call center application can access each individual shared software agent. Exemplary CRM business applications include applications for sales personnel, data analysis and campaign management. Sample customer applications include a Web site and a retail self-help kiosk.

Notably, the CRM applications can access one or more shared software agents using a publicly accessible network, such as the Internet. Thus, each of these shared software agents contains both visual and data management elements. Accordingly, the elements of the shared software agent operate independently of the CRM application accessing them. Additionally, multiple CRM applications can simultaneously access a particular shared software agent.

For example, the display and functionality of the Web site can be exclusively provided by the shared software agent accessed through a customer's Web browser. Furthermore, a call center application can contain an integrated view within its graphical user interface that accesses the shared software agent. Both the call center and customer now have identical, but independent, access to shared software agent information.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a solution for implementing a customer relationship management (CRM) system over multiple distribution channels. In particular, the present invention utilizes a shared software agent. The shared software agent can include both graphical and data management functions that can be accessed across a publicly accessible network by one or more CRM applications. A particular CRM application referred to as a call center application can access each of the shared software agents within the CRM system. Notably, each CRM application that accesses a shared software agent can provide its users with any published capabilities of the shared software agent. Accordingly, the present invention provides a CRM system that requires less maintenance than conventional CRM applications.

Figure 1:
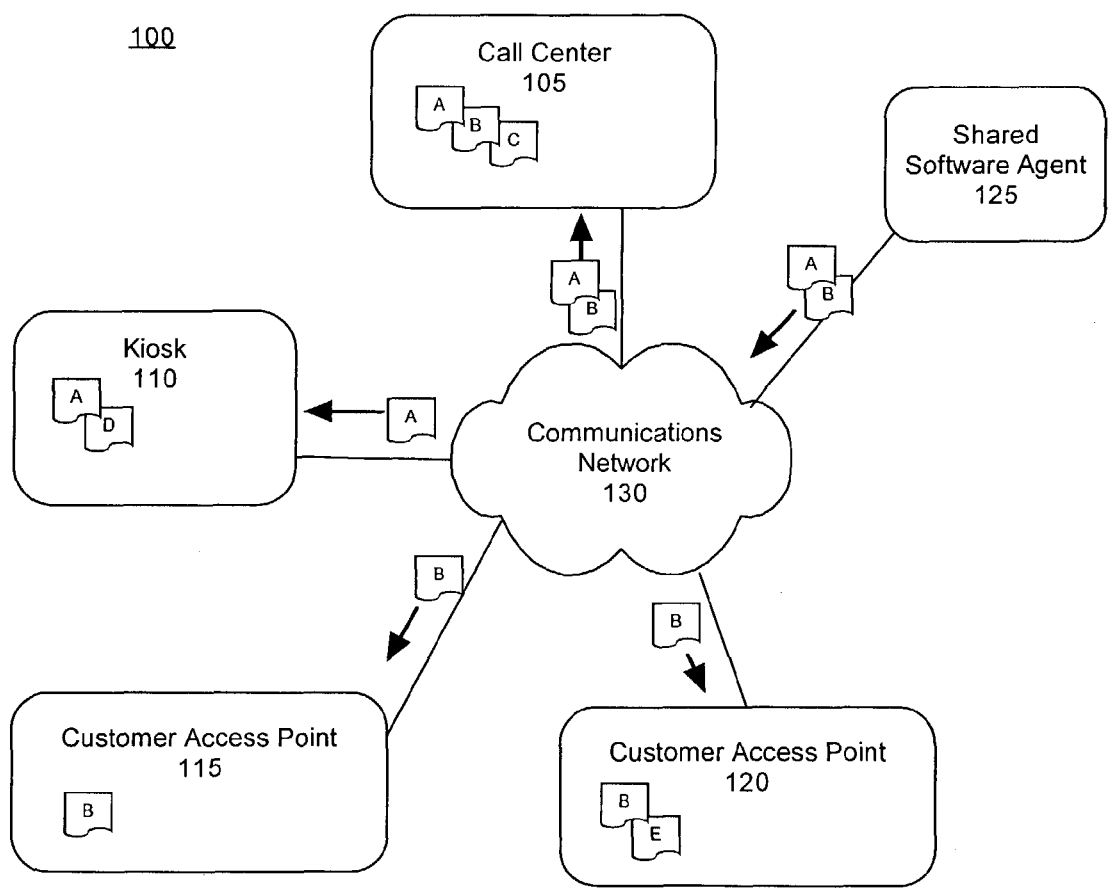
FIG. 1 is a schematic diagram illustrating a system for customer management in accordance with the inventive arrangements disclosed herein.

FIG. 1 is a schematic diagram illustrating a system 100 for customer management in accordance with the inventive arrangements disclosed herein. As shown in FIG. 1, the system 100 can include a call center application 105, a kiosk 110, a customer access point 115, a customer access point 120, and a shared software agent 125, each communicatively linked via a communications network 130. The call center application 105 can contain customer specific information including customer purchase histories, product pricing information, product inventory and warranty information, as well as customer loyalty program management data. A graphical user interface (GUI) of the call center application 105 can contain a plurality of views A, B, and C. Each CRM view published by the shared software agent 125, such as views A and B can be accessed by the call center application 105.

The kiosk 110 can include an assortment of interactive computing devices connected to the communications network 130 intended for customer use. For example, the kiosk 110 can be implemented as an in-store inventory search terminal, such as a book locator as is used by many book retailers. Further examples of kiosk 110 implementations can include, but are not limited to, an employee hiring station, a credit card or membership center, and an item pickup station. Although depicted as containing two views A and D, a GUI of the kiosk 110 can contain any number of views. Notably, view A can include one or more visual elements accessed from the shared software agent 125.

Customer access point 115 can be implemented in many different manners across a multiplicity of distribution channels. For example, when a distribution channel is a Web site, customer access point 115 can represent a customer at home accessing the Web site with a Web browser. In such an instance, the information displayed within the Web browser may consist entirely of the view B generated by the shared software agent 125. Alternatively, when a distribution channel is a retail outlet, the customer access point 115 can represent a computer used by the retailer to record purchasing information. When used by a retailer, customer access point 115 also can include business specific information as well as information relating to a customer. Accordingly, the shared software agent 125 accessed by the customer access point 115 can contain both business and customer information.

Another configuration of a CRM customer access point is represented by customer access point 120. Customer access point 120 can contain both customer and business information. In such an instance, view B, can contain customer specific information, and view E, not accessed across the communications network 130, can contain business specific information.

Notably, multiple customer access points, such as customer access points 115 and 120, as well as the call center application 105 can independently and simultaneously access view B generated by the shared software agent 125. Such commonality across system 100 can reduce employee training costs and present customers with a consistent interface across many CRM applications.

As previously noted, shared software agent 125 can be configured to independently perform data management and graphical functions within system 100. The shared software agent 125 can be implemented using any of a variety of techniques. For example, the shared software agent 125 can be implemented as an applet, accessible through an Internet Web browser. Alternatively, the shared software agent 125 can be an Internet enabled object linking and embedding (OLE) or OpenDoc object. Implementation of the shared software agent 125 is not limited to any particular standard or protocol.

Structurally, the shared software agent 125 can contain both a data segment and an interface segment. Although the shared software agent 125 can be communicatively linked to one or more distributed data stores, according to one embodiment of the present invention, the shared software agent 125 can internally store and manage data. The interface segment of the shared software agent 125 can include event-active visual components, such as check boxes or buttons. Furthermore, the shared software agent 125 can contain positional information concerning its visual elements. Such positional information can assure that visual elements within the software agent 125 retain spatial locations relative to one another when presented through one or more of the distribution channels. In consequence, the shared software agent 125 can concurrently or individually provide data, functions and graphical user interfaces to one or more of the CRM applications including customer access points 115 and 120, kiosk 110, and/or the call center application 105. Furthermore, each presentation of graphic elements and/or data which is obtained from the shared software agent 125 within a CRM application is independent of other presentations of graphic elements and/or data which are obtained from the same shared software agent 125 within a different CRM application.

Figure 2:
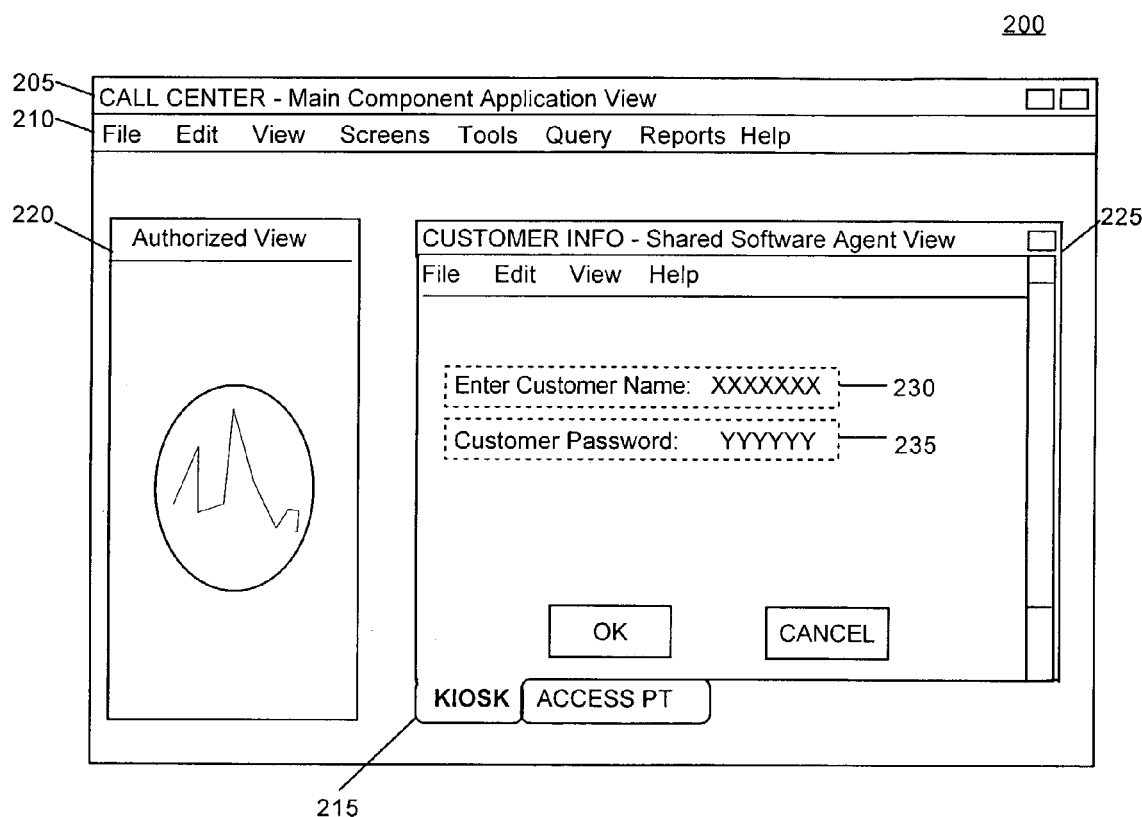
FIG. 2 is a schematic diagram illustrating a graphical user interface for use with the system of FIG. 1.

FIG. 2 is a schematic diagram illustrating an exemplary GUI 200 for use with the system of FIG. 1. More particularly, the GUI 200 can be presented by the call center application used with the CRM system. The GUI 200 can include a call center view 205 within which visual elements of the call center application are displayed. Some of the visual elements displayable within the call center view 205 can include a call center menu bar 210, an authorized view 220, a shared software agent view 225, and a shared software agent selection mechanism 215. The authorized view 220 can contain information not generally available to a customer. Notably, info presented within view 220 as well as the view 220 itself can be implemented locally and not accessible across a network.

The shared software agent selection mechanism 215 can provide a means for displaying shared software agent views. Although illustrated as a tabbed view selector, the invention is not limited to any particular implementation. For example, the shared software agent selection mechanism 215 can be a toolbar, wherein selection of a given shared software agent opens a view within the call center view 205. In another embodiment, the shared software agent selection mechanism 215 can be implemented as a pull down menu selectable from the menu bar 210, for example by accessing the "Screens" choice.

The shared software agent view 225, being disposed within the call center view 205, can display visual elements generated by a shared software agent. A single view, such as the one depicted, can be utilized by multiple shared software agents. For example, view 225 can display kiosk visual elements and/or views generated by a kiosk shared software agent. Responsive to the shared software agent selection mechanism 215, view 225 can alternatively display customer access point visual elements or entire views generated by a customer access point shared software agent. In one embodiment, the shared software agent view 225 can be a browser window located within the call center view 205 capable of accessing shared software agents. In another embodiment, a plurality of shared software views 225 can be displayed within a call center view 205, each shared software view 225 associated with a particular one of the shared software agents of a given CRM system, and accordingly being associated with a particular distribution channel.

A customer name 230 and customer password 235 prompt can appear within the shared software agent view 225. The invention can provide a mechanism for authorized business personnel to access customer-restricted information without entering a customer's password 235. For example in one embodiment, a call center employee can have a master password. Hence, upon entering a customer name 230, the representative can enter the master password when prompted for password 235.

Figure 3:
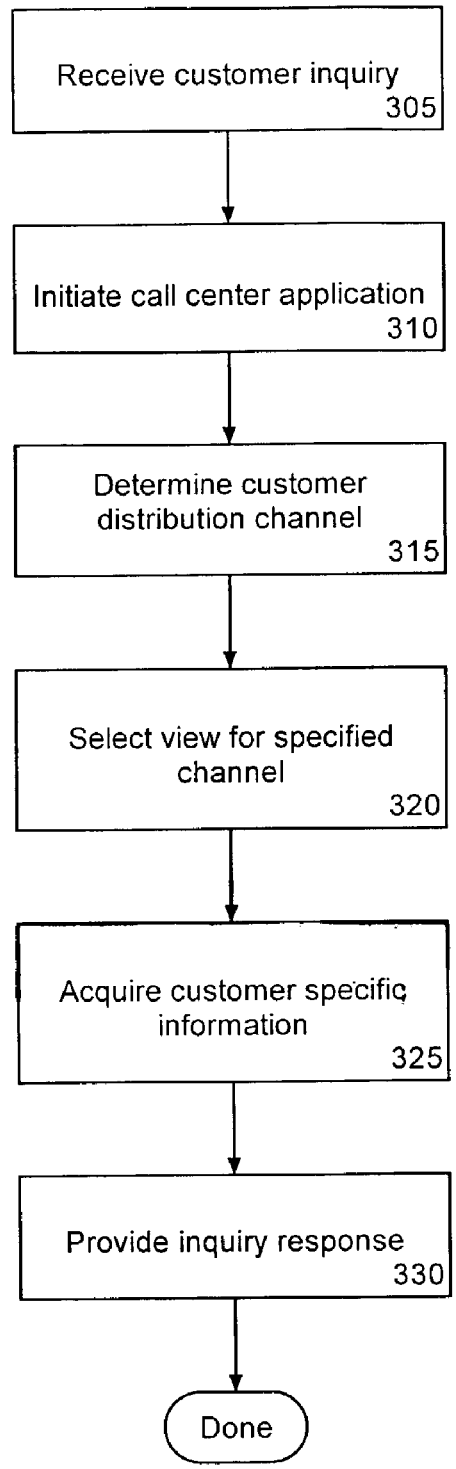
FIG. 3 is a flow chart illustrating a method of responding to a customer inquiry using the system of FIG. 1.

FIG. 3 is a flow chart illustrating a method 300 of responding to a customer inquiry using the system of FIG. 1. The method 300 can be performed in the context of a CRM system that utilizes one or more shared software agents. The method 300 can begin in step 305 when a call center employee receives a customer inquiry. For example, a customer utilizing a kiosk can use a mechanism within the kiosk to contact a call center representative. Exemplary contact mechanisms within a kiosk can include, but are not limited to, a telephone, a teleconferencing window, a chat window, and an instant messaging screen. Notably, customer contact need not be initiated from the kiosk, but can occur from any location, such as the customer's home, or via a telephone independent of the kiosk.

In step 310, the call center employee initiates the call center application. Notably, the application can already be open. In step 315, the call center employee determines the customer distribution channel from which the customer is calling. In one embodiment of the invention, the contact mechanism automatically provides the distribution channel used by the customer to the call center employee. For example, in an embodiment where a customer utilizes a teleconference function included within the kiosk to contact the call center, the call center employee can be notified by the teleconferencing function that the customer is utilizing a kiosk. In another embodiment, the call center employee may determine the relevant distribution channel by asking the customer.

In any event, once the customer distribution channel has been determined the method can proceed to step 320, where the call center employee selects the designated channel from within the CRM call center application. Notably, the CRM call center application allows the call center employee to access information for each distribution channel. For example, in one embodiment, the center employee can click a menu option from within the call center application to pull up a designated distribution channel, such as the kiosk. In another embodiment, the call center employee can utilize a browser from within the call center application that accesses customer loyalty information. Regardless of the method through which access is granted within a particular embodiment, the call center employee will be granted independent access to the same source information available to the customer. Additionally, the method can grant this independent access concurrently to both the customer and the call center employee.

In step 325, the call center employee acquires the customer specific information from the call center application for the customer. The call center employee can, but need not, access the same information that the customer is displaying. Once the information has been acquired in step 325, the call center employee can provide the customer with a response in step 330.

The various GUIs disclosed herein are shown for purposes of illustration only. Accordingly, the present invention is not limited by the particular GUI or data entry mechanisms contained within views of the GUI. Rather, those skilled in the art will recognize that any of a variety of different GUI types and arrangements of data entry, fields, selectors, and controls can be used.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method for implementing a customer relationship management system to provide consistent information over a plurality of different customer contact channels, the method comprising the steps of:

providing a computer having at least one memory and at least one processor, the at least one processor being configured to carry out the following steps:

establishing a plurality of different customer contact channels within the customer relationship management system, the plurality of different customer contact channels including at least a Web site, a retail outlet, a wholesale outlet, and a telephone center;

associating a customer relationship management application with each of said plurality of customer contact channels, each customer relationship management application being designed either for authorized business personnel or for customer access;

providing a shared software agent sharing graphical and data management functionality among customer relationship management applications associated with the plurality of customer contact channels respectively, information stored in the shared software agent being accessible simultaneously and independently by each customer relationship management application so that consistent information is provided over each of the plurality of different customer contact channels; and accessing the shared software agent from each customer relationship management application, each customer relationship management application being associated with a different customer contact channel, said shared software agent independently performs at least one data management task and displays at least one visual element within a graphical user interface of each said accessing customer relationship management application.

2. The method of claim 1, further comprising the steps of:
recording customer specific information; and,
utilizing said customer specific information from within said shared software agent.

3. The method of claim 1, wherein each customer relationship management application comprises at least one application selected from the group consisting of a customer service application, a sales facilitating application, a data analysis application, a campaign management application, a Web site, and a retail outlet application.

4. A customer relationship management system that provides consistent information over a plurality of different customer contact channels, the system comprising:
a plurality of different customer contact channels within the customer relationship management system, the plurality of different customer contact channels including at least a Web site, a retail outlet, a wholesale outlet, and a telephone center;
a plurality of customer relationship management applications, each customer relationship management application being associated with a corresponding one of the plurality of customer contact channels, the customer relationship management application being designed either for authorized business personnel or for customer access; and
a shared software agent sharing graphical and data management functionality among the plurality of customer relationship management applications, information stored in the shared software agent being accessible simultaneously and independently by each customer relationship management application, each customer relationship management application being associated with a different customer contact channel so that consistent information is provided over each of the plurality of different customer contact channels, wherein the shared software agent independently performs at least one data management task and displays at least one visual element within a graphical user interface of each said accessing customer relationship management application.

5. The system of claim 4, wherein said shared software agent further comprises:
a customer restricted segment, wherein access to said customer restricted segment via said customer component requires a customer password; and,
a non-restricted segment, wherein access is publicly granted.

6. The system of claim 5, wherein access to said customer restricted segment via a call center application does not require the customer password.

7. The system of claim 4, wherein each customer relationship management application comprises at least one application selected from the group consisting of a customer service application, a sales facilitating application, a data analysis application, and a campaign management application.

8. A non-transitory machine-readable storage having stored thereon, a computer program having a plurality of code sections, said code sections executable by a machine for causing the machine to perform a method for implementing a customer relationship management system with the steps of:
establishing a plurality of different customer contact channels within the customer relationship management system, the plurality of different customer contact channels including at least a Web site, a retail outlet, a wholesale outlet, and a telephone center;
associating a customer relationship management application with each of said plurality of customer contact channels, each customer relationship management application being designed either for authorized business personnel or for customer access;
providing a shared software agent sharing graphical and data management functionality among customer relationship management applications associated with the plurality of customer contact channels respectively, information stored in the shared software agent being accessible simultaneously and independently by each customer relationship management application so that consistent information is provided over each of the plurality of different customer contact channels; and
accessing the shared software agent from each customer relationship management application, each customer relationship management application being associated with a different customer contact channel, said shared software agent independently performs at least one data management task and displays at least one visual element within a graphical user interface of each said accessing customer relationship management application.

9. The non-transitory machine-readable storage of claim 8, further comprising the steps of:
recording customer specific information; and,
utilizing said customer specific information from within said shared software agent.

10. The non-transitory machine-readable storage of claim 8, wherein each customer relationship management application comprises at least one application selected from the group consisting of a customer service application, a sales facilitating application, a data analysis application, a campaign management application, a Web site, and a retail outlet application.

* * * * *